United States Patent [19]
Eckstein et al.

[11] Patent Number: 4,894,652
[45] Date of Patent: Jan. 16, 1990

[54] VEHICLE BRAKELIGHTS ACTIVATING DEVICE

[75] Inventors: Mordechai Eckstein, Kiron; Adir Shapira, Moshav Tal-Shahar, both of Israel

[73] Assignee: Atat Technology Ltd., Israel

[21] Appl. No.: 254,738

[22] Filed: Oct. 7, 1988

Related U.S. Application Data

[62] Division of Ser. No. 873,979, Jun. 13, 1986, Pat. No. 4,788,526.

[30] Foreign Application Priority Data

Oct. 24, 1985 [IL] Israel .................................. 76813

[51] Int. Cl.[4] ............................................. B60Q 1/26
[52] U.S. Cl. ................................... 340/467; 340/479; 200/61.89; 200/83 C; 200/86.5
[58] Field of Search .................... 340/71, 72, 66, 467, 340/479; 200/61.89, 86.5, 81 R, 83 C

[56] References Cited

U.S. PATENT DOCUMENTS

| | | | |
|---|---|---|---|
| 2,219,351 | 10/1940 | Worrall | 200/61.89 |
| 2,822,441 | 2/1958 | Fortney | 200/86.5 |
| 3,304,381 | 2/1967 | McAnespey | 200/61.89 |
| 3,427,583 | 2/1969 | Zackey | 340/66 |
| 3,638,181 | 1/1972 | Bryant | 340/71 |
| 3,912,892 | 10/1975 | Morehouse | 200/61.89 |
| 3,921,750 | 11/1975 | Shames | 340/71 |

FOREIGN PATENT DOCUMENTS 475812 2/1974 Australia .

Primary Examiner—Donald O. Woodiel
Assistant Examiner—Brian R. Tumm
Attorney, Agent, or Firm—Ostrolenk, Faber, Gerb & Soffen

[57] ABSTRACT

A device is provided, associated with the accelerator pedal of motor cars adapted to cause the lighting of the brake lights shortly before the brake pedal is applied in case of braking in an emergency. In one version of the device, it comprises a bellows mounted on the accelerator pedal. During normal driving, the bellows is pressed down to minimum volume thereof. When abruptly released, a sub-pressure is developed which is used to momentarily lift a metal flap which closes the brakelights circuit. The lights remain on until the light circuit is taken over by the brake pedal switching circuit. According to another version, the operation is based on the relative abrupt movement of a magnetic core surrounded by an induction coil. The electromotive force will generate a current effective to close the brakelights circuit.

3 Claims, 2 Drawing Sheets

VEHICLE BRAKELIGHTS ACTIVATING DEVICE

This is a division of application Ser. No. 873,979, filed June 13, 1986 now U.S. Pat. No. 4,788,526, issued Nov. 29, 1988.

BACKGROUND OF THE INVENTION

The present invention relates to signalling devices, and more particularly to signalling associated with the braking of vehicles.

It is known that brakelights are provided in every car which become actuated when the brake pedal is applied by the driver to alert drivers of vehicles behind the braking car so as to avoid a collision.

It is also well known that an inevitable time-lag occurs between the moment the driver notices the danger and removes his foot from the accelerator pedal and the moment when the driver actually applies the brake pedal, which is professionally called the reaction or response time. This time delay, particularly in high speed driving, is considered a major factor in the occurrence of car accidents.

It is the major object of the present invention to devise means that will effectively decrease to a minimum the above described time-lag.

It is a further object of the invention to provide the accelerator pedal of vehicles with a device which will be instantaneously responsive to the abrupt or sudden release of the foot from the pedal, i.e. well before the normal brakelights will become actuated.

It is a still further object of the invention that such device will remain ineffective in non-emergency cases, namely where the accelerator pedal is released for purposes other than emergency braking, e.g. gear change or other normal deaccelerations.

SUMMARY OF THE INVENTION

According to the invention there is provided a signalling device comprising a first member associated with one terminal of an electrical signalling apparatus circuit and a second member associated with another terminal of the apparatus. Displaceable mounting means are provided between the first and second members allowing relative movement therebetween. Electrical actuating means are installed between the members in a normal breaking position with respect to the apparatus circuit. Means for making the circuit are provided which upon an abrupt relative displacement of the members away one from the other actuate the apparatus circuit.

In application of the device for vehicle brakelights system, one of the members is adapted to be immovably fastened to the accelerator pedal of a vehicle and the other, movable member is adapted to be pressed by the accelerator pedal operating foot of the driver against the said displaceable means.

According to one, the "pneumatic" embodiment of the invention, the first and second members form a hollow housing within which there is defined an air chamber having an air inlet opening at one side and a displaceable wall portion at its opposite side, constituting the said other member, a light-weight, freely floating conductive metal flap being provided at the vicinity of the air inlet, the arrangement being such that during normal, depressed position of the accelerator pedal, the flap is kept at a small distance from the air inlet, and upon an abrupt release of the pedal, the flap becomes sucked by sub-pressure momentarily prevailing within the air chamber, and engages a portion of the air inlet thereby making the circuit.

According to another, the "electric" embodiment of the invention, the first and second members form a housing having one wall thereof movable relative to the other, immovable wall, electromotive generating means, comprising an induction coil and a magnetic core being associated each with one of the said walls.

BRIEF DESCRIPTION OF THE DRAWINGS

The two embodiments of the invention will be described hereinbelow with reference to the accompanying drawings, wherein.

DETAILED DESCRIPTION OF THE PREFERRED EMBODIMENTS

Figure 1:
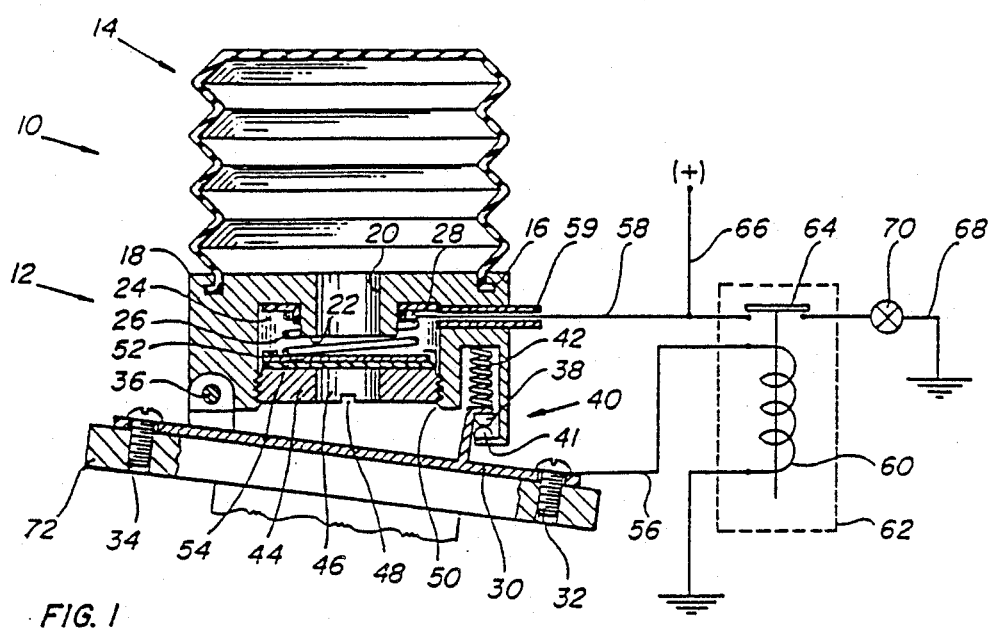
FIG. 1 is a schematic, cross-sectional view of a first embodiment of the invention.

The pneumatic version of the device, denoted 10 in FIG. 1, generally comprises a first, immovable housing member 12 and a second, movable housing member 14 constituted by a bellows, namely an accordion-like rubber sleeve mounted by its bead-like rim 16 in a sealed manner within an annular recess 18 formed in the upper wall portion of the housing member 12.

Housing member 12 is further provided with a centrally extending bore or opening 20 with a downwardly projected rim 22 defining therearound an annular cavity 24 which accommodates a coil spring 26.

Should the housing member 12 be made of a conductive material such as metal—as in fact assumed for the purposes of the following description—an insulating washer 28 for the spring 26 must be provided, as shown. While the housing member 12 may be directly mounted on the accelerator pedal of a vehicle, it is advisable to provide a hinged base-plate 30, associated with an enabling micro-switch device in the following manner.

The plate 30 is provided with suitable openings for mounting-screws 32 and 34, and is hinged to the housing 12 by a hinge 36. It further carries a first, upper contact 38 of a switching device 40, whose other contact 41 is carried by an extended portion of the housing member, as shown.

A coil compression spring 42 is provided for the instantaneous closing of the contacts immediately before and during the operational stage of the device, as will be described below.

Referring back to the interior structure of the housing member 12, there is provided at its bottom side a screw threaded plug 44 having a through-going bore 46 and screwdriver slots 48 for threading the plug, as well as for adjusting its position within the tapped bore 50.

Plug 44 carries a disc 52 made of an insulating material, and on top of which there is seated a thin and light-weight flat disc or flap 54 made of a conductive material such as metal. The flap 54 is pressed against the plug 44 by the coil spring 26, which is, however, extremely weak, as will be explained further below.

Electric terminals are associated with the device 10 in the following manner. A first terminal 56 is connected to one side of an induction coil 60 and also, by the screw 32, to the housing member 12 via the contacts 38 and 41; a second terminal 58 is connected to the coil spring 26 but isolated from the housing by a sheath 59; the spring 26 being, as mentioned above, isolated from the remaining housing member 12 but in electrical contact with the metal flap 54.

The aforementioned components, shown in the schematic electrical diagram of FIG. 1, terminals 56 and 58 to complete (under the below described conditions) an electrical path from an electrical supply source 66 (battery) to the induction coil 60 of a relay device 62 whose contact member 64 makes/breaks contact between the same electrical supply source 66 and the ground connection 68 via brake lamps 70 of the regular brake-pedal operated system (not shown).

Figure 2:
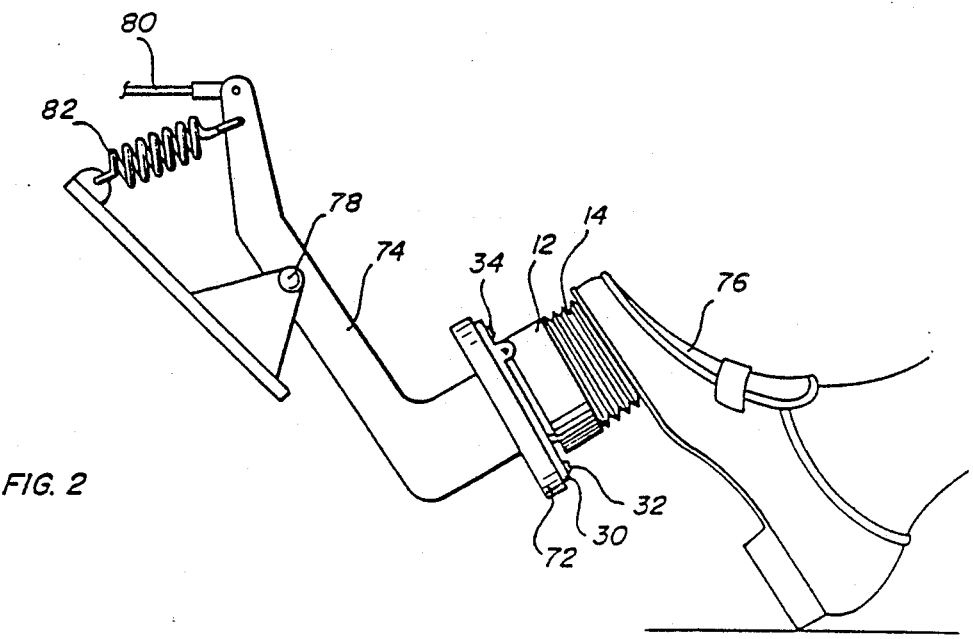
FIG. 2 illustrates the mounting of the device on the accelerator pedal of a vehicle.

As schematically shown in FIG. 2, the device 10 is mounted by the screws 32 and 34 to plate 72 of accelerator pedal 74.

Foot 76 of the driver now operates (presses) the accelerator pedal via the bellows 14 and the housing member 12, rather than directly on pedal plate 72. In all other respects the accelerator pedal remains unchanged, namely it is mounted to the car chassis by pivot 78, coupled to carburetor cable 80 and is biased by return spring 82. It will be evident from the foregoing description that during normal driving of the car, pedal 74 is held depressed by the driver's foot 76 when the bellows 14 is in its contracted state. Contacts 38 and 41 are separated (not shown).

Should now the driver abruptly remove his foot from the pedal, the switching device 40 closes, and the bellows 14 will become momentarily effective to generate sub-pressure thereinside, and cause an air suction effect through the opening 20. This will force the lifting of the flap 54 to become engaged against and make electrical contact with the rim 22, and shortcircuit the terminals 56 and 58 through the coil spring 26. By actuation of the relay 62, the brakelights 70 will become lit, irrespective of the fact that the driver has not yet applied the brake pedal, which will eventually occur within a fraction of a second following the release of the accelerator pedal, namely after the reaction period has lapsed.

It will be readily understood that the above-described operation of the device is conditional upon a sudden and quick release of the accelerator pedal, since a moderate movement will allowo air to gradually refill the chamber within the bellows 14 without casing the air-lift or suction phenomena of the required amount to overcome the coil spring force 26, and it is thereby assured that no false warning signals wills be emitted. In any event, on the one hand, the amount or rate of pedal release effective impulse can be calibrated by adjusting the screw threaded plug 44 within its bore 50; and, on the other hand, the provision of the switch 40 assures that the lights will operate if—and only if—the foot 76 is completely removed and the device resumes the state shown in FIG. 1.

Figure 3:
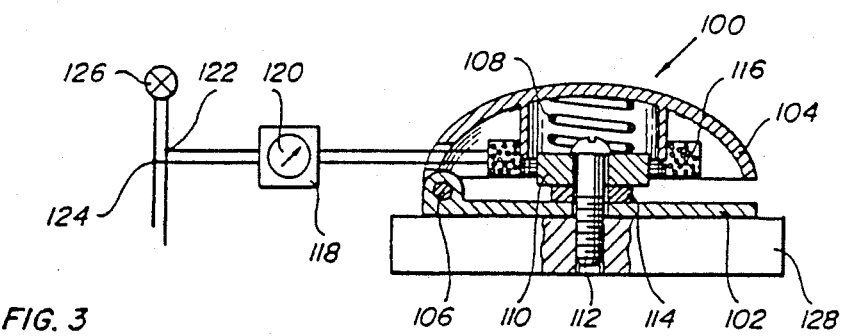
FIG. 3 is a schematic cross-sectional view of a second embodiment of the invention.
Figure 4:
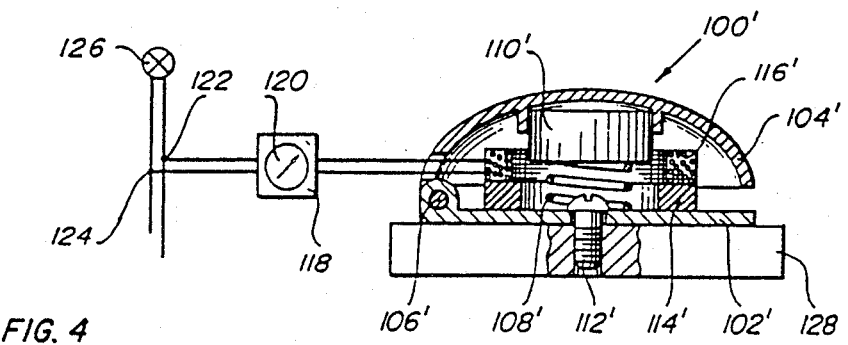
FIG. 4 shows a modified version of the device of FIG. 3.

Turning now to FIGS. 3 and 4, there is shown the purely electrical version of the device according to the present invention. Hence, the device generally denoted 100 comprises a bottom, immovable housing member 102 and a complementary, movable housing member 104, hinged to each other by a pin 106. Housing members 102 and 104 are kept apart from each other by coil spring 108, acting against a magnet disc 110 centrally mounted on housing member 102 by screw 112 passing through the disc 110 and an insulating washer 114.

Circumferencing the disc 110 and at an elevated level with respect thereto, there is provided an induction coil 116. The coil 116 is connected to an induction current responsive circuit 118 which comprises also voltage regulating means (potentiometer) 120 and terminals 122 and 124 connected across brake lights 126.

As known, the induction coil 116 and the permanent magnet disc 110 constitute together an electromotive generator in the sense that should the magnetic flux of the coil 116 be dynamically interfered with by the passage of the disc 110, an electromotive power will be generated, causing by induction a current flow in the coil 116, which current will be utilized by the circuit 118 to activate the brakes lights 126 in a manner already described with respect to the former embodiment of the invention (i.e., actuating a relay device).

It will be again appreciated that only an abrupt relative movement of the coil and magnet will suffice to produce the desired actuation of the lights; slower movements, below a predetermined amount which can be regulated by the potentiometer 120, will be of no effect whatsoever. The device 100' of FIG. 4 only differs with respect to the former embodiment in that the coil 116' and the disc 110' are each mounted to the housing members 102' and 104', respectively.

Figure 5:
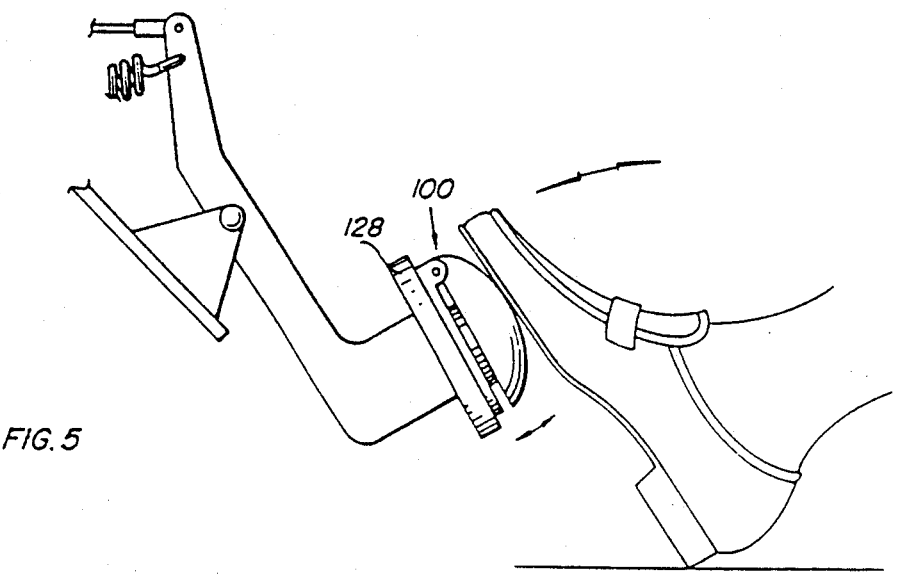
FIG. 5 shows the device of FIG. 3 or 4 mounted on a foot pedal of vehicle.

The mounting of the device 100 or 100' on accelerator pedal 128 is schematiclly shown in FIG. 5, in a manner analogous to that of FIG. 2.

Tests with devices featuring the principles of the present invention have ascertained that the sometimes disastrous reaction time is significantly shortened, say, by between 0.5 and 0.3 seconds, periods which correspond to a braking-distance decrease of about 8 and 12 meters at respective speeds of 60 and 100 kmh; such braking-distance decrease might well make all the difference between safe stopping of a car in emergency cases and disastrous accidents.

Those skilled in the art will readily appreciate that many modifications and variations may be applied to the above-described illustrative embodiments of the invention. For example, the body of the housing member 12 (FIG. 1) may be made of plastic material and the electrical connections be modified accordingly to achieve short-circuiting of the signalling circuit by the metal flap 54 when contacting the rim of the opening 20 which, for that purpose, should be made of a metallic material and appropriately connected to terminal 56; the devices proper may be formed as attachments for existing accelerator pedals of vehicles (as exemplifed hereinabove) or may be formed as an integral, originally installed accessory of the vehicle. It should therefore be understood that the invention should not be construed as limited to the exemplified embodiments but only as defined in and by the appended claims.

What is claimed is:
1. A signalling device comprising:
   a first member;
   a second member, the first member being adapted to be affixed to the accelerator pedal of a vehicle and the second member being adapted to be pressed and movable by the accelerator pedal operating foot of a driver;
   displaceable mounting means between the first and second members allowing relative movement therebetween;

first and second terminals associated with an electrical circut for operating the brakelights of a vehicle;

the first and second members forming a hollow housing within which there is defined an air chamber having an air inlet opening and a displaceable, lightweight, freely floating conductive metal flap at the vicinity of the air inlet opening, the arrangement being such that during normal, pressed position of the accelerator pedal, the flap is kept at a small distance from the air inlet opening, and upon an abrupt release of the pedal, the flap becomes sucked by a sub-pressure momentarily prevailing within the air chamber, and engages a portion of the air inlet opening thereby making the circuit;

means for making the circuit upon an abrupt relative displacement of the members away one from the other to actuate the circuit; and adjusting means for adjusting the effective amount of relative movement for making the circuit.

2. The device as claimed in claim 1 wherein the first member comprises a flange portion defining the air chamber and a projecting rim therearound, said displaceable mounting means comprising a bellows seated on a top side of the flange around the air chamber, the bellows comprising a displaceable wall portion at that end of the bellows which is disposed distally of the flange, the adjusting means comprising a plug member threadably mounted to the first member below and supporting the flap, and the means for making the circuit including electrical connections for closing the circuit by contact between the flap and the rim.

3. The device as claimed in claim 2 comprising a switching device for enabling the circuit only upon complete displacement of the members.

* * * * *